United States Patent
Stephenson

[19]

[11] Patent Number: 6,149,315
[45] Date of Patent: *Nov. 21, 2000

[54] SIDE LOAD RESISTANT BUILDOUT

[75] Inventor: Daniel Lee Stephenson, Lilburn, Ga.

[73] Assignee: Lucent Technologies Inc., Murray Hill, N.J.

[ * ] Notice: This patent is subject to a terminal disclaimer.

[21] Appl. No.: 09/148,390

[22] Filed: Sep. 4, 1998

[51] Int. Cl.[7] ..................................................... G02B 6/38
[52] U.S. Cl. ................................................. 385/60; 385/73
[58] Field of Search ................................... 385/53, 55–56, 385/58–60, 62, 66, 70, 72–73, 75–78, 81, 84, 139–140

[56] References Cited

U.S. PATENT DOCUMENTS

| | | | |
|---|---|---|---|
| 5,067,783 | 11/1991 | Lampert | 385/60 |
| 5,082,345 | 1/1992 | Cammons et al. | 385/60 |
| 5,212,752 | 5/1993 | Stephenson et al. | 385/78 |
| 5,274,729 | 12/1993 | King et al. | 385/134 |
| 5,481,634 | 1/1996 | Anderson et al. | 385/76 |
| 5,647,043 | 7/1997 | Anderson et al. | 385/78 |
| 5,719,977 | 2/1998 | Lampert et al. | 385/60 |

*Primary Examiner*—John D. Lee
*Assistant Examiner*—Michelle R. Connelly-Cushwa

[57] ABSTRACT

A buildout system generally comprising a buildout base and a buildout cap. The base includes lateral sides that extend beyond the top and bottom sides of the base to form side flanges, and upper and lower panel flanges that extend upwardly and downwardly from the side flanges. In addition, the base includes a plurality of gussets that extend forwardly from the lateral sides of the base. The cap includes upper and lower latch tabs that extend outwardly from the top and bottom sides of the cap and a plurality of recesses that are adapted to receive the gussets of the base. In one aspect of the invention, the base further includes vertical flanges and the cap includes vertical recesses adapted to receive the vertical flanges of the base when the cap is releasably connected to the base.

14 Claims, 15 Drawing Sheets

SIDE LOAD RESISTANT BUILDOUT

FIELD OF THE INVENTION

The invention relates generally to a device for coupling optical fibers. More particularly, the invention relates to an optical fiber buildout system having a narrow footprint that is resistant to side loads.

BACKGROUND OF THE INVENTION

Often times it becomes necessary to arrange a plurality of optical fiber connectors in a connection panel to facilitate multifiber connections. Typically, devices for holding connectors are mounted in the panel, but the connectors themselves are not connected to incoming or outgoing fiber paths until needed to provide service. Commonly used devices which are used to accommodate interconnections are generally referred to as couplings. One type of coupling which is mounted in a connection panel is known as a buildout system.

Coupling components of buildout systems such as buildout bases and caps can be received in the connection panels to accommodate the optical fiber connectors to be installed at a future time. This permits the installer to connect a first connector, which terminates an incoming or outgoing fiber path, to a buildout base and await future connection of a second connector which terminates another outgoing or incoming fiber path.

One frequently used optical fiber connector is the ST® connector, ST being a registered trademark the of AT&T Corporation. The ST connector is disclosed, for example, in U.S. Pat. No. 4,934,785, which was issued on Jun. 19, 1990, in the names of Mathis and Miller. Other popular optical fiber connectors include the SC connector and the FC connector.

One known buildout system capable of accommodating ST, SC, and FC connectors is disclosed in U.S. Pat. No. 5,274,729, which issued on Dec. 28, 1993, in the names of King et al. The King et al. system includes a plurality of buildout bases, identified in the patent as "blocks," that are adapted for mounting to a panel through a plurality of openings provided therein. Further disclosed is a plurality of buildout caps, identified in the patent as "buildouts," that are adapted to be removably attached to the buildout bases mounted to the connection panel. The bases are provided with front apertures that each form a keyway that is adapted to align and receive a cylindrical sleeve housing of the caps. Both the bases and caps are open-ended such that they can receive the optical fiber connectors to be coupled within the buildout. Inside the cylindrical barrel of each cap is an attenuator element which is used to attenuate the signal traveling from one fiber to the next.

Although the King et al. system described above functions adequately well, demand for increasing numbers of optical fiber connections has prompted the design of smaller optical fiber coupling systems that occupy less space. For instance, one recently developed optical fiber connector is the LC® connector, LC being a registered trademark of Lucent Technologies, Inc. This connector is disclosed, for example, in U.S. Pat. No. 5,481,634, which was issued on Jan. 2, 1996, in the names of Anderson et al. The design of the LC connector is advantageous because the connector has a smaller footprint than each of its predecessor connectors and therefore requires less panel space.

Although development of the LC connector has shown that optical fiber connectors can be successfully reduced in size, similar size reduction of buildout systems is more problematic. In particular, reducing the size of the buildout creates a number of difficulties that do not exist or that are not as significant in the larger buildout systems currently used with the ST, SC, and FC connectors. One problem is that buildout manufacture processes become much more difficult as the buildout components and the structural features of these components become smaller. For example, the molding of extremely small structural details can be difficult.

Another problem with buildout size reduction relates to buildout strength and durability. Again, if the size of the buildout is substantially decreased, the strength and durability of the buildout likewise decreases and the likelihood of buildout failure increases. For instance, the design of the cylindrical sleeve housing of the buildout cap must be such that it can flex sufficiently to permit insertion of the attenuator and attenuator retention means, but must not permanently deform to the point at which the attenuator element could dislodge or be damaged. Furthermore, despite its reduced size, the buildout must withstand a certain degree of side loading applied to the buildout caps via the fiber cables to protect the fragile optical fibers contained therein.

A further complication created by reduced size occurs in the buildout assembly process. Specifically, assembly of the buildout cap and the attenuation means can be difficult when the constituent components of the buildout system are small, especially when such assembly is conducted out in the field. Therefore, provision must be made for structural features that permit the technician to manipulate more easily the components of the system to avoid structural damage to the buildout and optical fibers and to prevent delays in servicing.

Accordingly, it can be appreciated that it would be desirable to have a buildout system that can accommodate ST, SC, and FC connectors as well as LC connectors, which has a relatively narrow footprint such that connection panel space may be optimized. Furthermore, it would be desirable to have such a buildout system that can be relatively easily manufactured and assembled. Moreover, it would be desirable to have such a buildout system which is adequately strong and durable. The present disclosure discloses one such buildout system.

SUMMARY OF THE INVENTION

The present invention relates to a buildout system generally comprising a buildout base and a buildout cap. The buildout base includes a top side, a bottom side, a front side, a rear side, and opposed lateral sides. Extending from the lateral sides is a plurality of gussets. Typically, the lateral sides of the base extend beyond the top and bottom sides to form side flanges. The base usually further includes upper and lower panel flanges having central notches provided therein. The panel flanges extend upwardly and downwardly from the lateral sides of the base.

The buildout cap includes a top side, a bottom side, a front side, a rear side, and opposed lateral sides. Formed at the junction of the top and bottom sides with the lateral sides is a plurality of recesses that are adapted to receive the gussets of the base when the cap is releasably connected to the base. The cap normally includes upper and lower latch tabs that extend outwardly from the top and bottom sides of the cap. These latch tabs are adapted to fit closely between the side flanges of the base.

When the cap is connected to the base, the latch tabs of the cap are positioned closely between the side flanges of the base and matingly engage the central notches in the base panel flanges. This close fitting arrangement increases the buildout's resistance to side loads by providing a large contact surface area between the base and cap. Further strength is provided to the buildout through the combination of the base gussets and the cap recesses.

In one aspect of the invention, the base further comprises a pair of plate-shaped vertical flanges that extend outwardly from the front side of the base and the cap further comprises a pair of vertical recesses that are adapted to receive the vertical flanges of the base. The relationship between the vertical flanges and the vertical recesses further increases the size of the contact surface area between the base and cap to further increase the buildout's resistance to side loads.

The objects, features, and advantages of this invention will become apparent upon reading the following specification, when taken in conjunction with the accompanying drawings. It is intended that all such additional features and advantages be included therein with the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
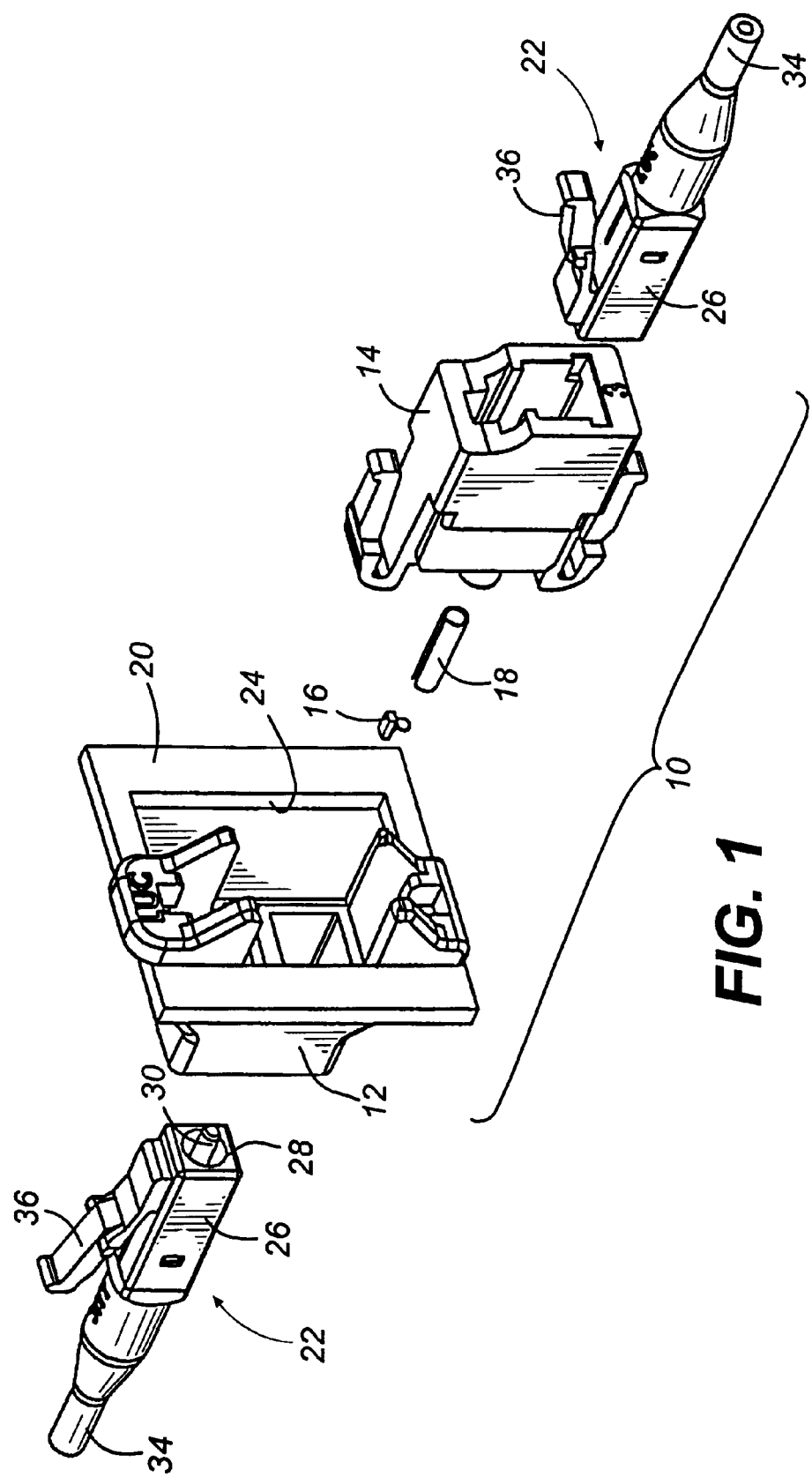
FIG. 1 is an exploded perspective view of a buildout system constructed in accordance with the present invention shown along with a connection panel and a pair of optical fiber connectors.

Referring now in more detail to the drawings, in which like numerals indicate like parts throughout the several views, FIG. 1 illustrates, in exploded view, a buildout system or buildout 10 constructed in accordance with the present invention. As indicated in this figure, the buildout system generally comprises a buildout base 12, a buildout cap 14, an attenuator element 16, and a ferrule sleeve 18. The entire buildout system is the subject of U.S. patent application Ser. No. 09/148,348, filed concurrently herewith.

As shown in FIG. 1, the buildout 10 is typically used in conjunction with a connection panel 20 and two optical fiber connectors 22. The panel is provided with an elongated continuous slot 24 which is adapted to accommodate a plurality of buildouts such as the buildout 10 shown in FIG. 1. For purposes of illustration, the connectors 22 shown in FIG. 1 are LC connectors of the type described in, for example, U.S. Pat. No. 5,481,634, which is hereby incorporated by reference into the present disclosure. It is to be understood, however, that usage of the present invention is not limited to facilitating LC connectors, but further includes facilitating of ST, SC, and FC connectors, as well as connectors not yet in existence. As identified in FIG. 1, each connector 22 comprises a generally rectilinear housing 26 having an opening 28. Protruding from the opening is a ferrule 30 which contains an optical fiber (not visible). This optical fiber extends from the tip of the ferrule 30, along the length of the connector 22, and outwardly therefrom through an optical cable 34. To permit attachment of the connector to other apparatus, the connector is provided with a latch tab 36 that extends upwardly from the housing 26.

Figure 2:
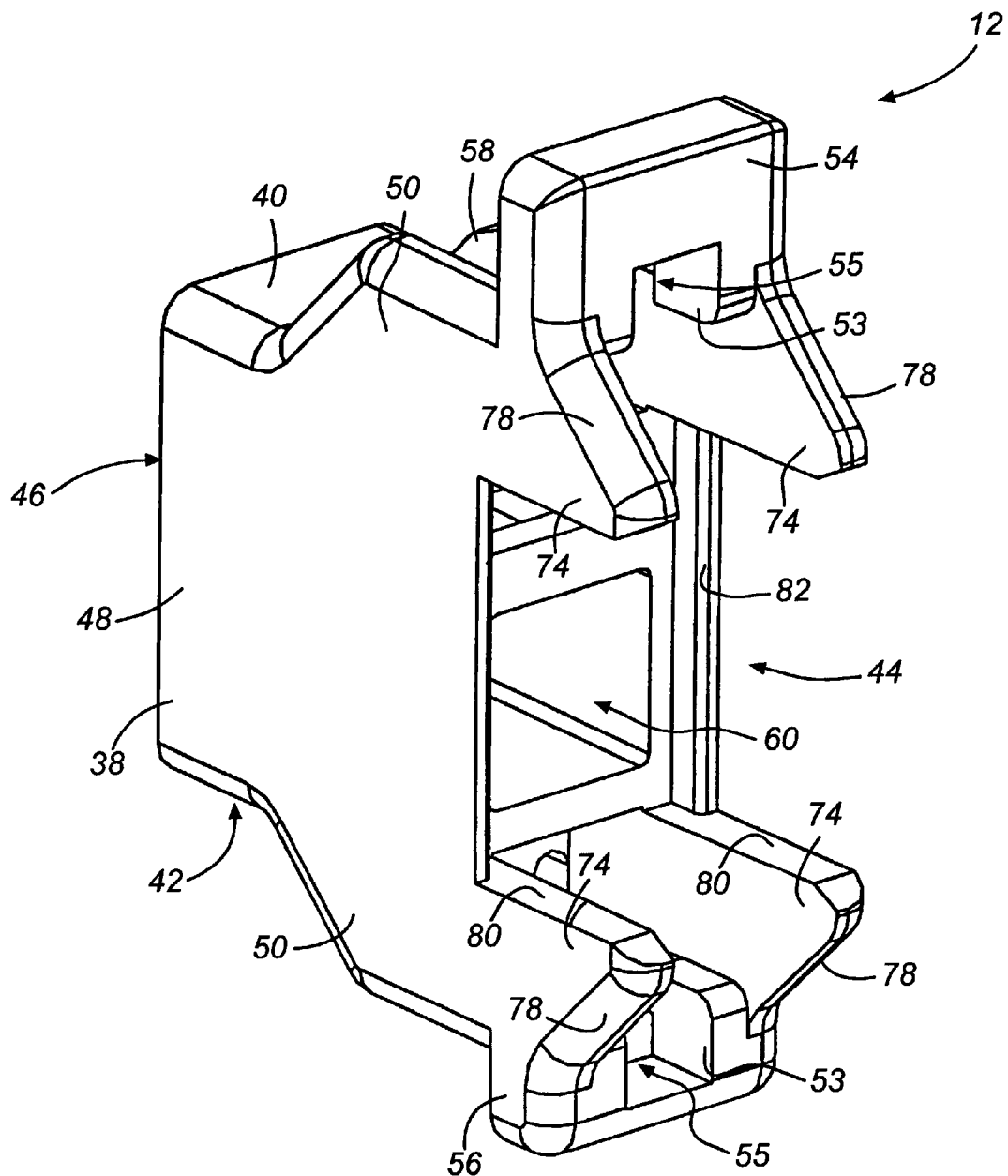
FIG. 2 is a front perspective view of the buildout base of the buildout system shown in FIG. 1.
Figure 3:
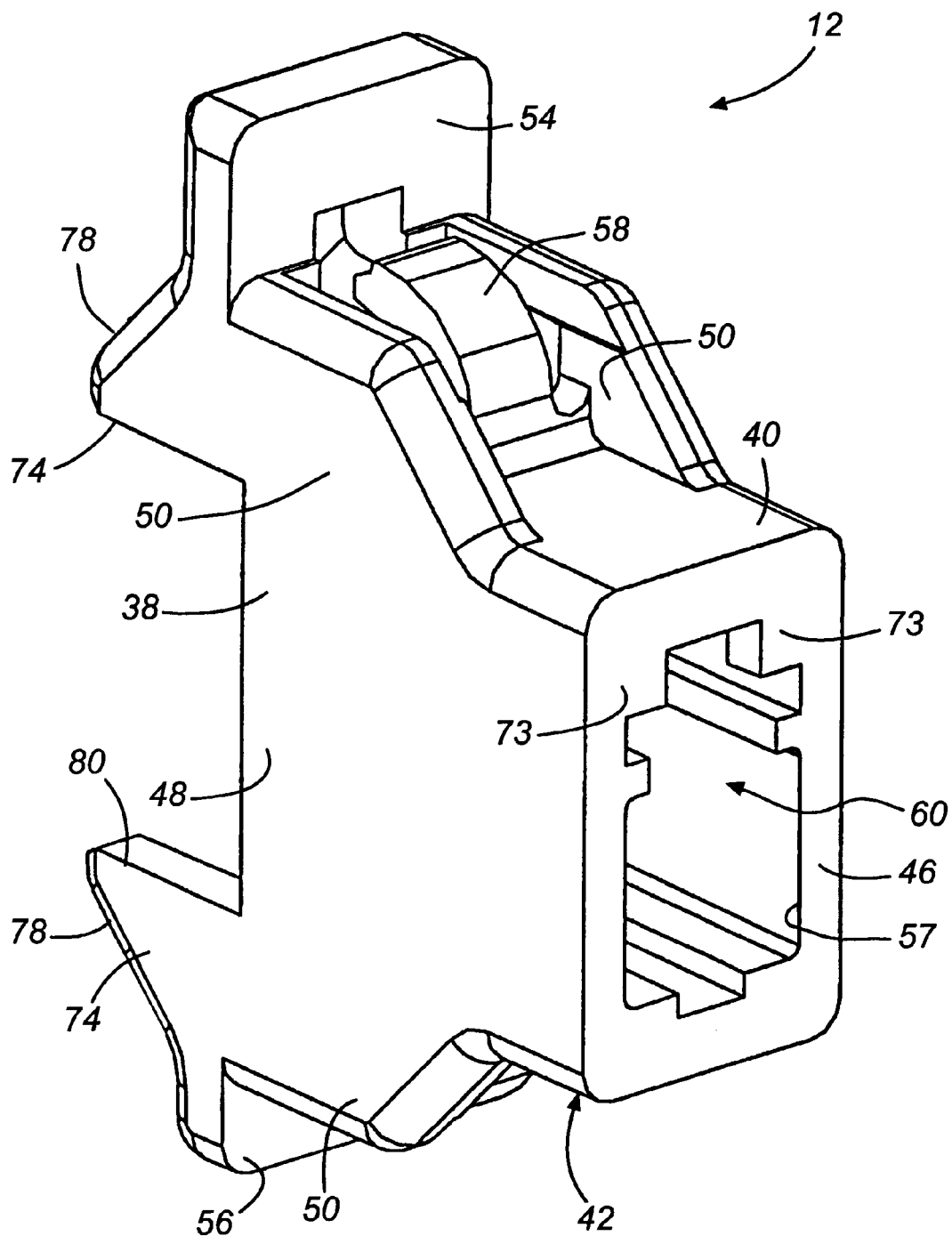
FIG. 3 is a rear perspective view of the buildout base shown in FIG. 2.
Figure 4:
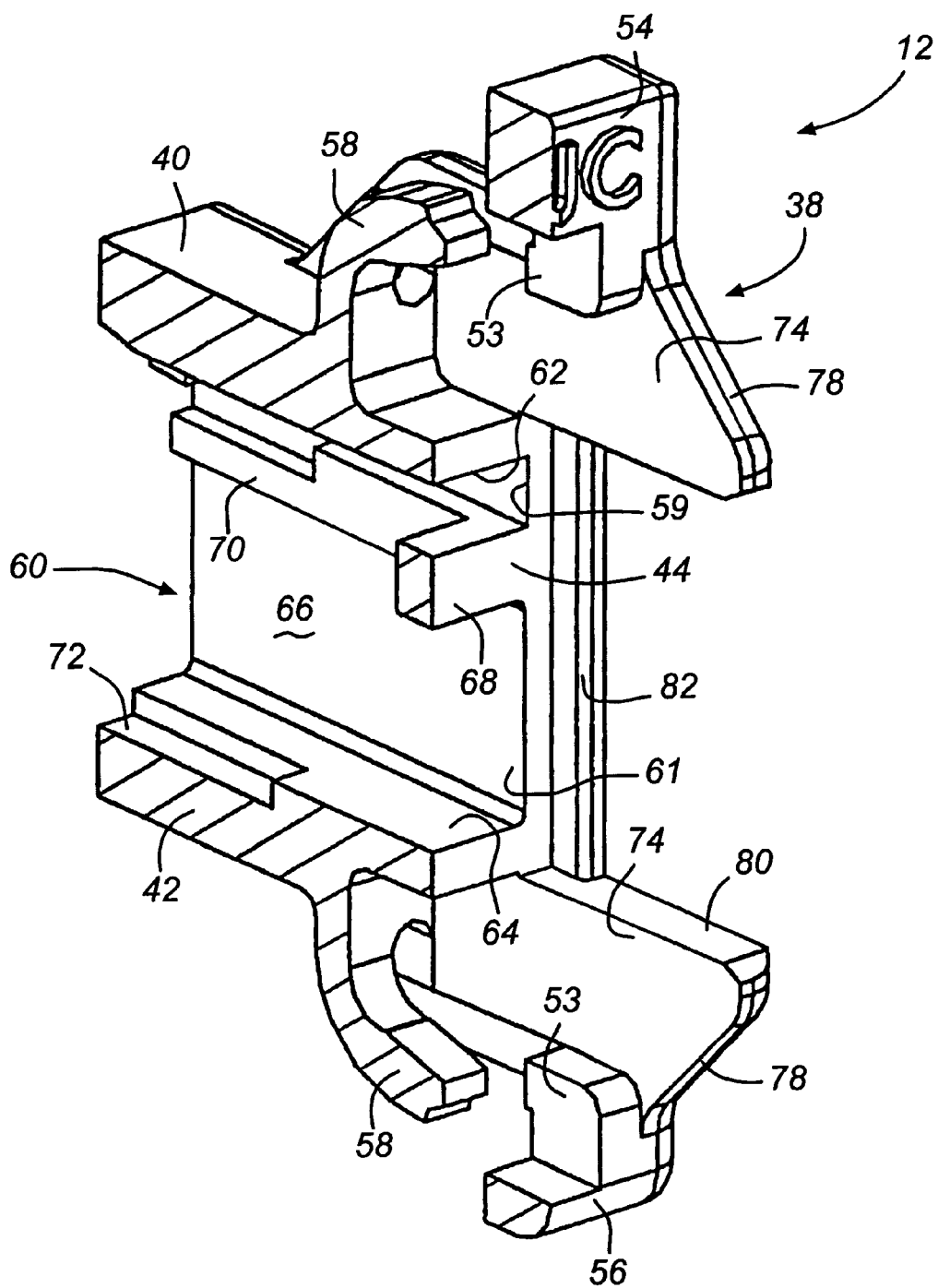
FIG. 4 is a cross-sectional front perspective view of the buildout base shown in FIGS. 2–3.

FIGS. 2–4 illustrate the buildout base 12 in detail. The base comprises a housing 38 that is preferably composed of a resilient polymeric material such as polyetherimide. The housing generally comprises a top side 40, a bottom side 42, a front side 44, a rear side 46, and a pair of opposed lateral sides 48, each of which typically is unitarily constructed with the housing. As indicated in FIGS. 2 and 3, the lateral sides 48 typically extend beyond the top and bottom sides 40 and 42 to form upper and lower pairs of side flanges 50. Extending outwardly from the upper and lower side flanges 50 are upper and lower panel flanges 54 and 56, respectively. Each of these flanges is provided with a central notch 55 defined by opposed side surfaces 53. These flanges 50 are normally unitarily formed with the side flanges and are adapted for engagement with a connection panel in which the base is to be installed. Usually, one of the panel flanges is longer than the other to provide a visual aid for proper installation of the base. In the embodiment shown in FIGS. 2–4, the upper panel flange 54 is longer or taller than lower panel flange 56, indicating the top end of the base. Extending outwardly from the top and bottom sides and between each pair of side flanges 50 is a latch tab 58 (FIGS. 3–4). These latch tabs are substantially arcuate in shape and typically are unitarily formed with the housing 38.

Extending through the housing 38 from the rear side 46 of the base and opening 57 to the front side 44 of the base is an internal passage 60. As depicted most clearly in FIG. 4, this passage is formed by an upper wall 62, a lower wall 64, and opposed lateral walls 66. Extending between the two lateral walls 66 is a beam 68 which forms part of the front side 44 of the base (FIG. 2). This beam partitions the passage 60 to form openings 59 and 61 and therefore a keyway adapted for receipt of the buildout cap. Extending backward from the beam 68 along the lateral walls 66 of the passage 60 to the rear side 46 of the base is a pair of interior rails 70. As shown in FIG. 4, each of these rails forms the general outline of a pair of contiguous, dissimilarly sized rectangles. Provided in the lower wall 64 of the opening is a channel 72. The channel extends from the rear side 46 of the base to a point approximately half-way along the length of the passage 60. The rails 70, the channel 72, and a pair of corner portions 73 formed with the rear side 46 of the base together provide the shape of the opening 57 provided in the rear side (FIG. 3).

Protruding from the front of the buildout base are upper and lower pairs of gussets 74. As shown in FIG. 4, the gussets extend inwardly from the panel flanges 54 and 56, and forwardly from the side flanges 50. Typically the gussets are unitarily formed with the housing and are defined by an oblique edge 78 and a horizontal edge 80 and therefore are substantially triangular in shape. As explained in greater detail below, the gussets, along with the side flanges, are adapted to support securely the buildout cap against side loads applied thereto with the optical cable. Further indicated in FIG. 4, the lateral sides 48 extend a small distance beyond the front side 44 and between the gussets 74 to form vertical flanges 82.

Figure 5:
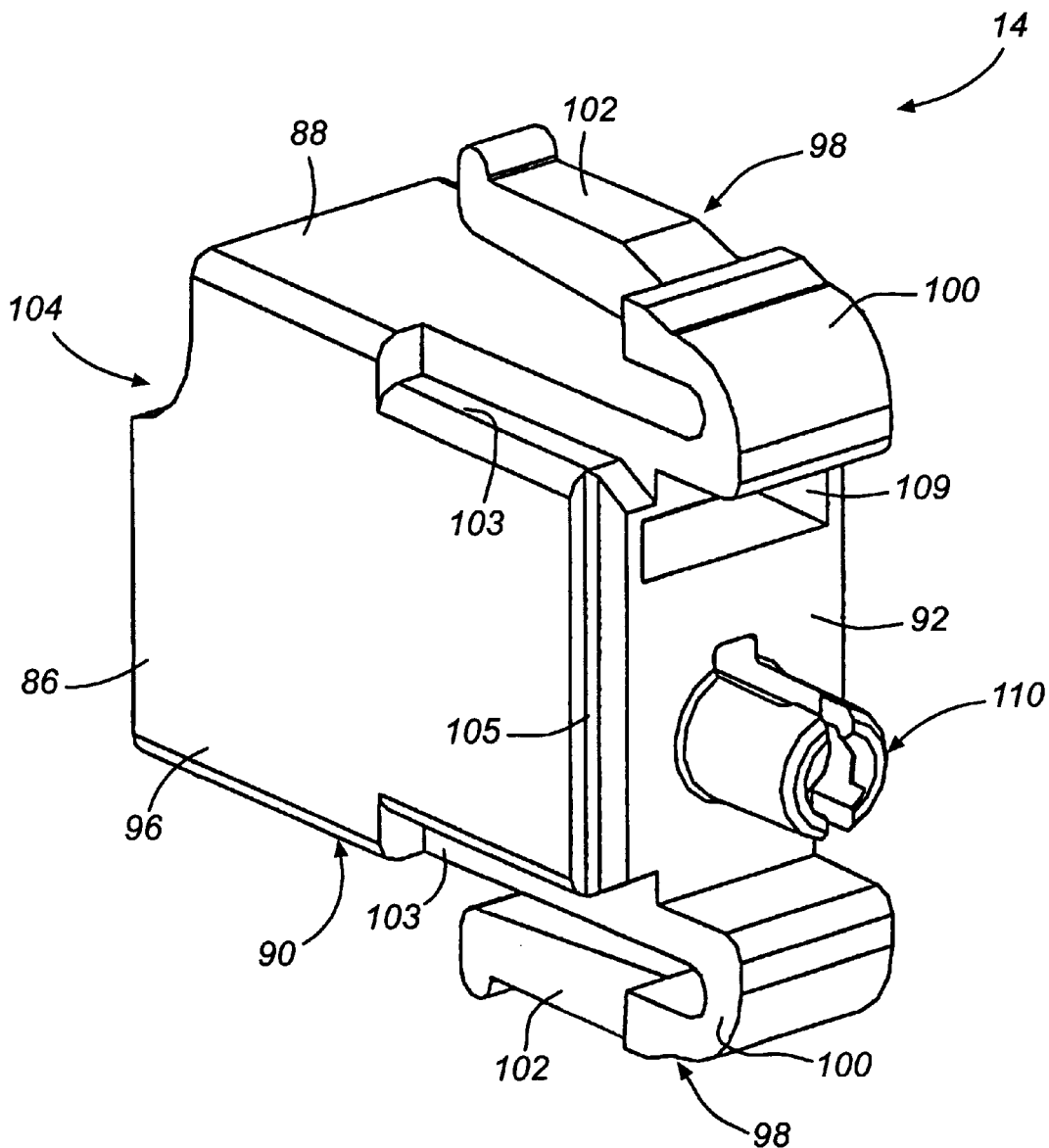
FIG. 5 is a front perspective view of the buildout cap of the buildout system shown in FIG. 1.
Figure 6:
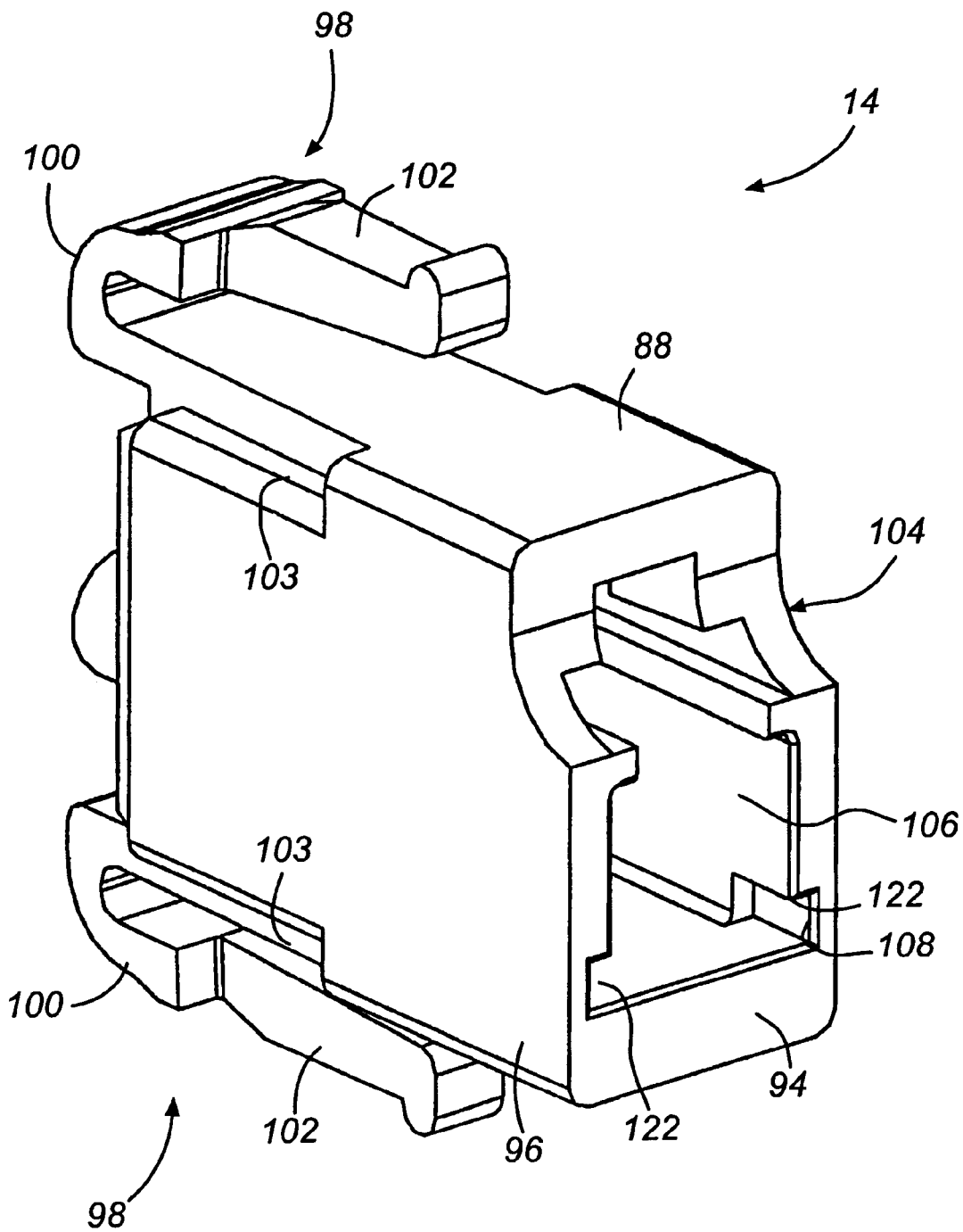
FIG. 6 is a rear perspective view of the buildout cap shown in FIG. 5.
Figure 7:
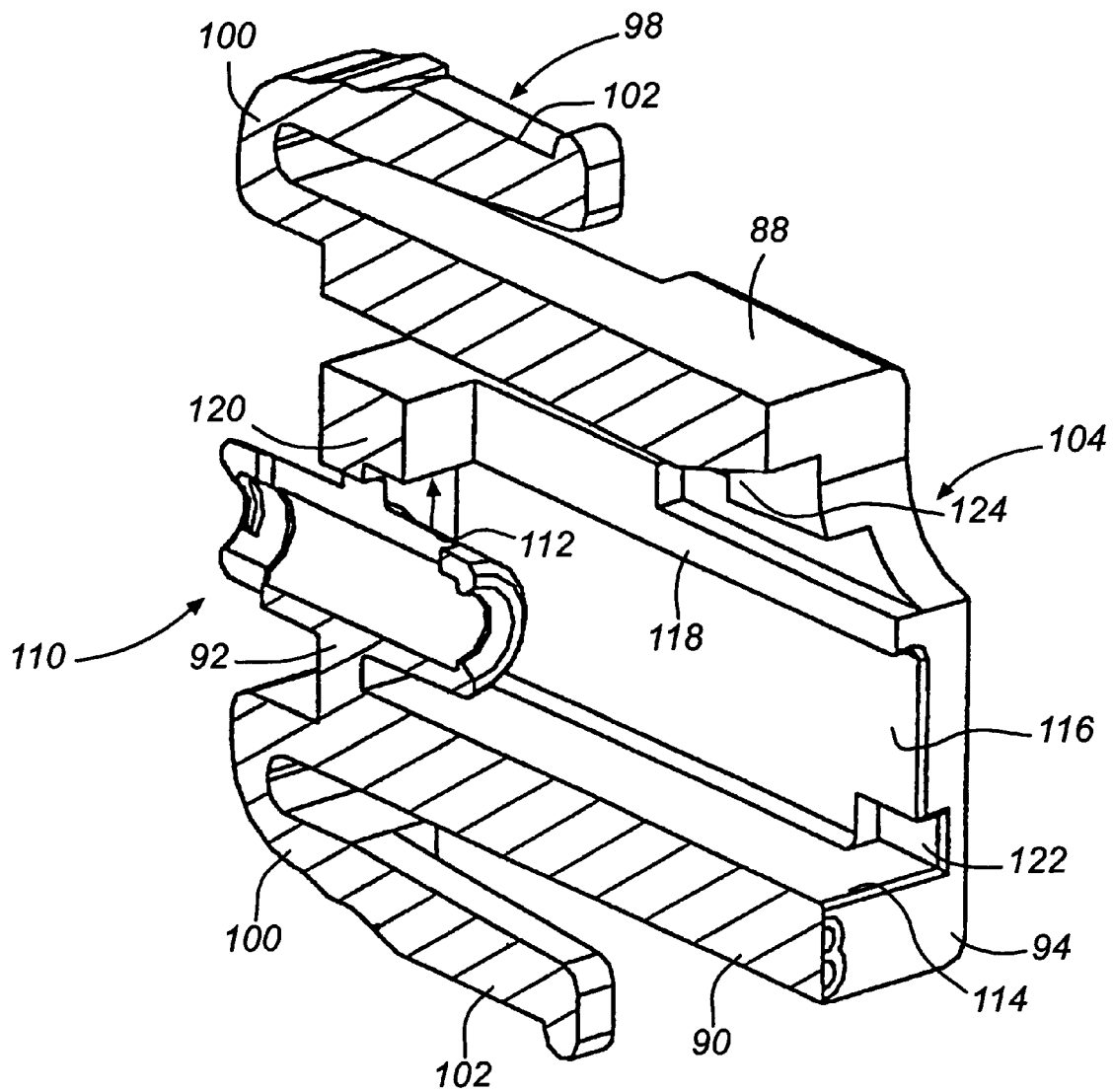
FIG. 7 is a is a cross-sectional rear perspective view of the buildout cap shown in FIGS. 5–6.

FIGS. 5–7 illustrate the buildout cap 14. The cap comprises a generally rectilinear housing 86 that is preferably composed of a polymeric material similar to that used to construct the base 12. The housing generally comprises a top side 88, a bottom side 90, a front side 92, a rear side 94, and a pair of opposed lateral sides 96, each of which typically is unitarily constructed with the housing. Extending outwardly from the top side 88 and the bottom side 90 are elongated latch tabs 98. Each latch tab has an arcuate, relatively wide base portion 100 that typically is unitarily formed with the top side 88, and a substantially straight, relatively narrow upper portion 102 that is adapted for receipt by the central notches 55 of the buildout base panel flanges 54 and 56. Formed at the juncture of the lateral side 96 with the top and bottom sides 88 and 90 adjacent the front of the cap are recesses 103 that, as described below, are adapted to receive the gussets 74 of the base 12. Formed at the juncture of the lateral sides 96 and the front side 92 are vertical recesses 105 that are adapted to receive the vertical flanges 82 of the base.

As shown in FIG. 6, the rear of the cap 14 has an arcuate notch 104 formed therein. Like the upper panel flange 54, this arcuate notch provides a visual aid which indicates the correct orientation of the cap to the technician. Passing through the arcuate notch 104 and the remainder of the rear side 94 of the cap is an internal passage 106. Access to the passage 106 is provided through an opening 108 provided in the rear side 94 of the cap. At the other end of the passage 106 is an upper slot 109 and a sleeve housing 110, through which the passage can be reached. As shown in FIG. 7, the internal passage 106 is formed by an upper wall 112, lower wall 114, and opposed lateral walls 116. Formed along the lateral walls is a pair of interior rails 118. The rails 118 extend from the rear side 94 of the cap to a ledge 120 formed on the inside surface of the front side 92. Similar to the interior rails of the buildout base 12, each of the interior rails 118 of the cap forms the general outline of a pair of contiguous, dissimilarly sized rectangles. Further provided in the lateral walls 116 is a pair of lower notches 122. As indicated in FIG. 7, the upper wall 112 includes an inclined surface 124 that intersects and inclines toward the rear side 94 of the cap.

Figure 8:
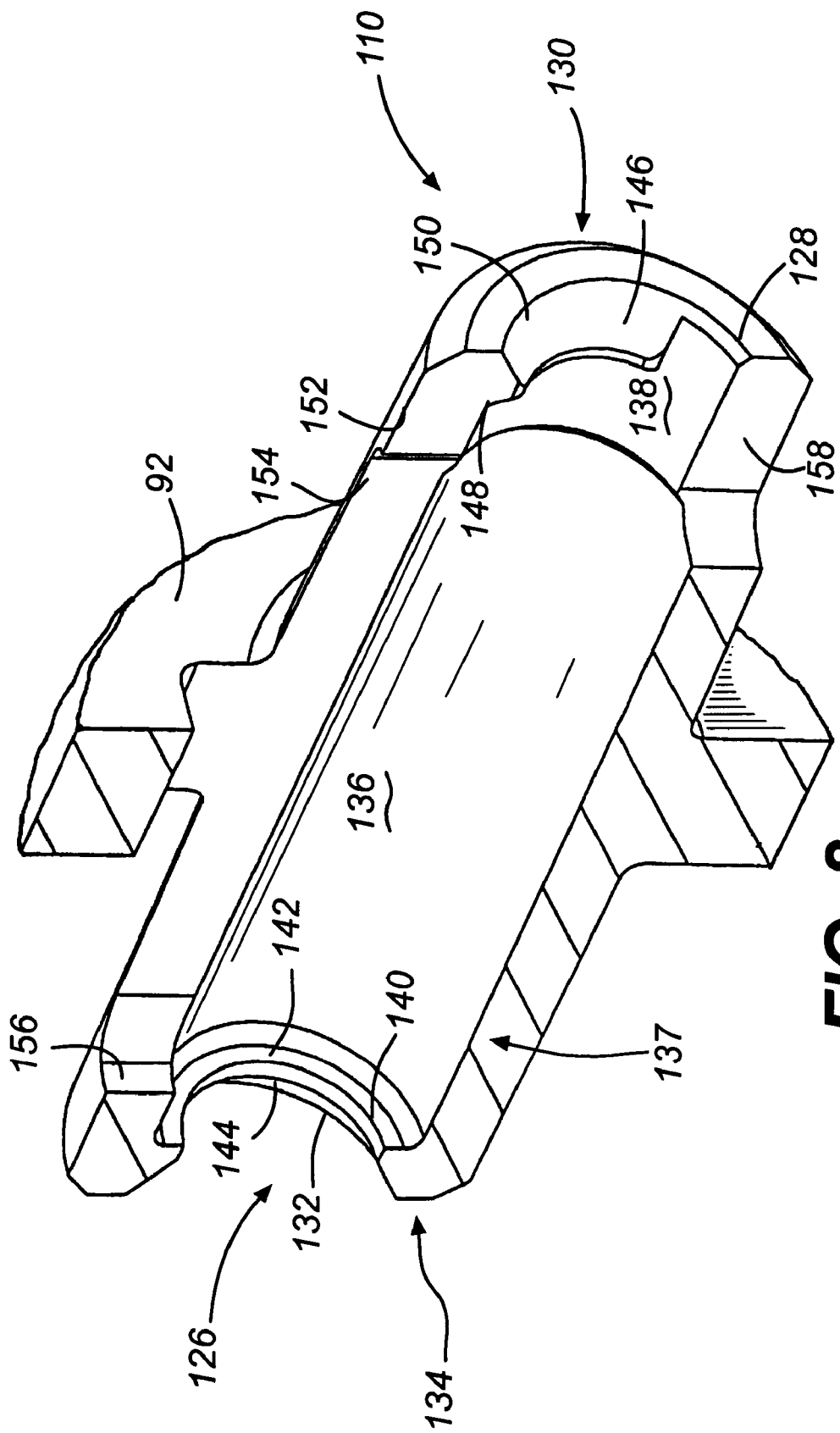
FIG. 8 is a cross-sectional partial side perspective view of the buildout cap shown in FIGS. 5–7 illustrating the features of the sleeve housing.

As indicated in FIG. 7, the front wall 92 supports the sleeve housing 110. Typically, the sleeve housing is unitarily formed with the front side 92 and extends both outwardly beyond the cap and inwardly into the internal passage 106. FIG. 8 is a cross-sectional cut-away view of the cap which illustrates the sleeve housing 110 and a portion of the front side 92. As indicated in this figure, the sleeve housing 110 is formed as a substantially cylindrical tube having a substantially cylindrical passage 126 that extends therethrough from a first opening 128 provided at the front end 130 of the sleeve housing to a second opening 132 provided at the rear end 134 of the sleeve housing. The cylindrical passage 126 comprises a relatively large main section 136 and a relatively small front section 138. Although the front section 138 has a diameter that is slightly smaller than that of the main section 136, the distal portion of the main section 136 has a slight taper 137 formed adjacent the second opening 132 that has an average diameter substantially similar in magnitude to that of the front section 138.

Figure 9:
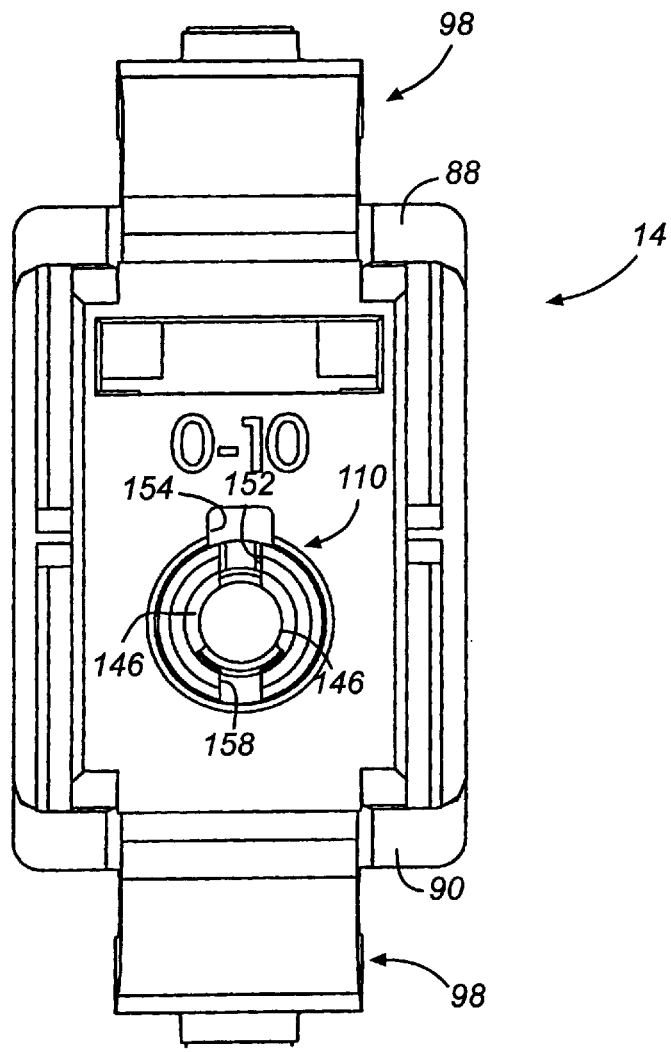
FIG. 9 is a front view of the buildout cap shown in FIGS. 5–7.
Figure 10:
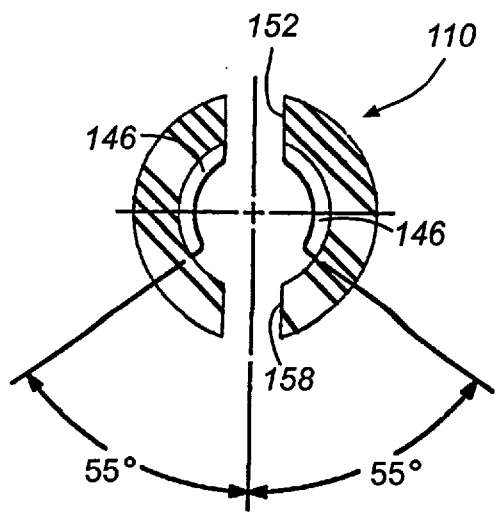
FIG. 10 is a front view of the sleeve housing shown in FIG. 8 illustrating the partial flanges.

At the rear end 134 of the sleeve housing is a continuous inner flange 140. This inner flange is defined by a relatively straight surface 142 that extends substantially radially inward from the walls of the main section 136 of the passage, and by an angled surface 144 that creates a chamfer at the second opening 132. At the front end 130 of the sleeve housing is a pair of partial inner flanges 146. Unlike the continuous inner flange 140 formed at the rear end of the sleeve housing, the partial inner flanges extend from a point approximately 55 degrees from the bottom center of the sleeve housing passage (indicated by 0) to a top notch 152 formed at the tip of the sleeve housing (FIGS. 9–10). The partial inner flanges 146 are defined by an inner 148 and an outer 150 angled surfaces. Like the angled surface of the second opening, the angled surface 150 of the first opening 130 forms a chamfer at the opening 128.

As shown in FIG. 8, the top notch 152 joins an attenuator element travel slot 154. The travel slot 154 is both longer and wider than the top notch 152 and, as shown in FIGS. 5 and 7–8, extends through the front side 92 of the cap outwardly beyond the sleeve housing 110, and ends at an end point 156 adjacent the continuous inner flange 140. Positioned opposite the top notch 152 is a bottom notch 158 which is approximately the same width as the top notch. The sleeve housing is the subject of U.S. patent application Ser. No. 09/148,388, filed concurrently herewith.

Figure 11:
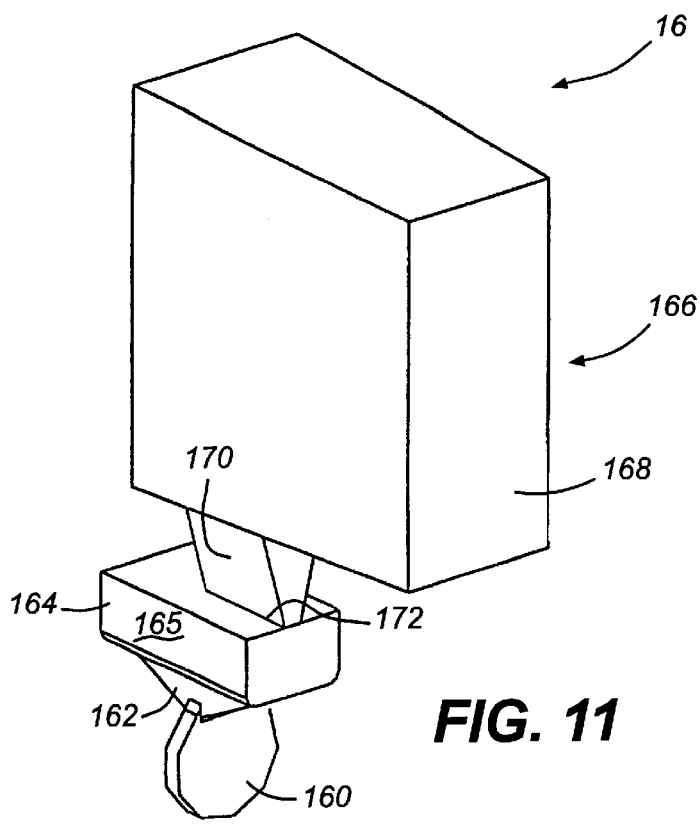
FIG. 11 is rear perspective view of the attenuator element shown in FIG. 1.
Figure 12:
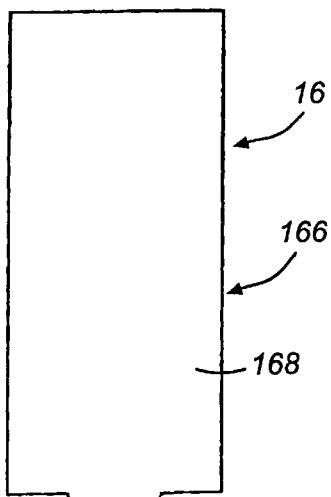
FIG. 12 is a front view of the attenuator element of FIG. 10.
Figure 13:
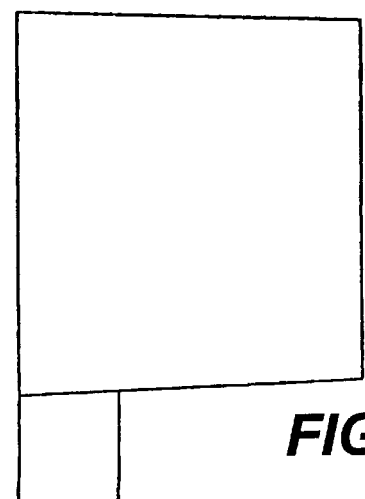
FIG. 13 is a side view of an alternative attenuator element.

Illustrated in FIGS. 11 and 12 is an attenuator element 16. The attenuator element, or attenuator, is typically constructed unitarily from an acrylic material and comprises an optical member 160. As depicted in FIG. 11, the optical member is substantially thin and planar and typically is formed as a disk, although it will be appreciated that other shapes are possible. Normally, the optical member has a thickness in the range of approximately 0.0028 inches to 0.072 inches, depending on the amount of attenuation desired. For example, an optical member 0.0028 inches thick provides approximately 0.5 dB of attenuation while an optical member 0.072 inches thick provides approximately 20 dB of attenuation. Although FIG. 11 depicts the optical member as being relatively thin, it will be appreciated that attenuator element can be constructed with a thicker or thinner optical member depending upon the amount of attenuation needed. Accordingly, the disk can be relatively thick and substantially cylindrical in shape as shown in FIG. 13 with optical member 160'.

The optical member 160 is connected to a neck portion 162. The neck portion 162 is relatively short in length, the length dimension of the neck being smaller than the height (diameter) dimension of the optical member. As shown in FIGS. 11 and 12, the neck portion connects the disk to a head portion 164, the purpose of which being described below. The head portion has opposed, substantially parallel sides 165. As indicated in FIGS. 11–12, the attenuator element typically is provided with a removable grip 166. The grip typically comprises a substantially planar body portion 168 that is connected to a wedge portion 170. The wedge portion connects the body portion 168 of the grip 166 to the head portion 164 of the attenuator element. As shown in FIG. 11, the wedge portion 170 narrows as it approaches the body portion and terminates at a breaking point 172. Constructed in this manner, the attenuator element can be manipulated by the technician by grasping the grip between the technician's fingers. Once the attenuator element has been placed into an appropriate location, the grip can be removed from the attenuator element by simply bending the grip laterally toward the side of the attenuator element until the grip breaks off.

Figure 14:
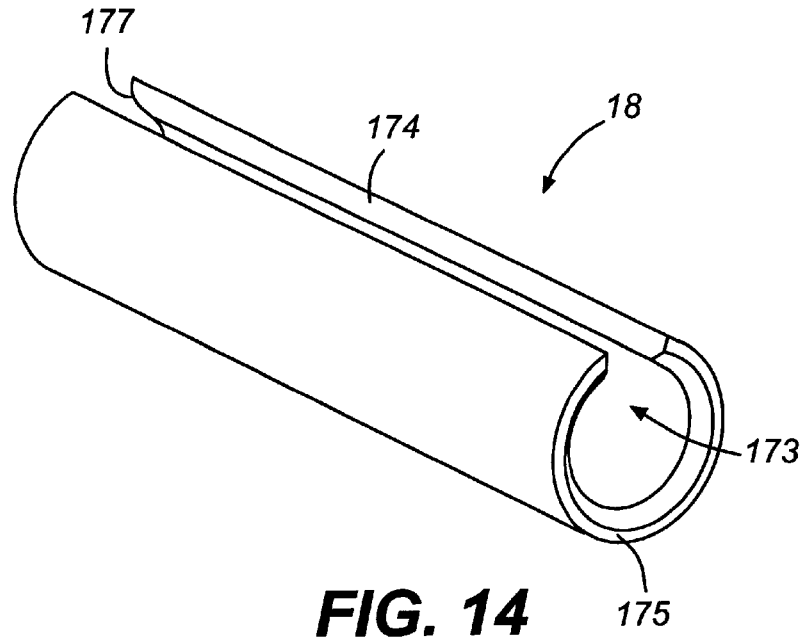
FIG. 14 is a front perspective view of the ferrule sleeve of the buildout system shown in FIG. 1.

The attenuator element 16 is specifically adapted for insertion into a ferrule sleeve 18. As shown in FIG. 14, the ferrule sleeve 18 is a substantially cylindrical tube having a substantially cylindrical passage 173 formed therein. A continuous longitudinal slot 174 extends from a first end 175 to a second end 177 of the sleeve. In that the ferrule sleeve must flex slightly during installation, it is normally constructed of a flexible but durable material. Presently preferred for this material is metal such as phosphor-bronze, although it will be appreciated that polymeric or ceramic materials could alternatively be used. The attenuator element is the subject of U.S. patent application Ser. No. 09/148,271, filed concurrently herewith.

Figure 15:
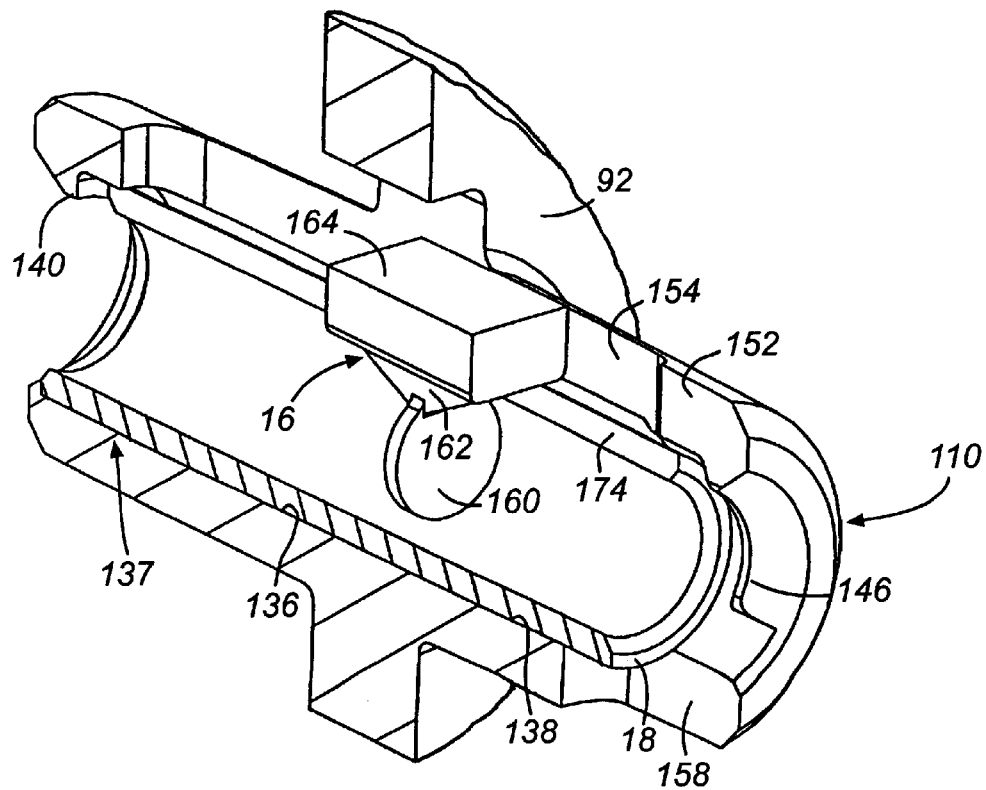
FIG. 15 is a cross-sectional partial side perspective view of the buildout cap illustrating the positioning of the attenuator element and ferrule sleeve within the sleeve housing.

The primary components of a buildout system according to the present invention having been described, the assembly of the buildout will now be described. First, the optical member 160 of the attenuator element 16 must be housed inside the sleeve housing 110 of the cap. To accomplish this, the optical member 160 is placed within the ferrule sleeve 18 with the grip 168 and is slid along the continuous longitudinal slot 174 of the ferrule sleeve to a to a medial portion of the sleeve (FIG. 15). The neck portion 162 of the attenuator is wide enough to suspend the optical member within the ferrule sleeve to prevent it from contacting the ferrule sleeve inside surfaces and support the attenuator element on the sleeve.

Once the attenuator element is disposed within the ferrule sleeve, the grip 168 can be broken off from the attenuator element by bending the grip laterally as described above. Since the cross-sectional area of the breaking point 172 of the grip is small, a clean break can be achieved. Moreover, because the grip is broken off, as opposed to being sawed or ground off, polymeric residue created by the separation is minimal, thereby avoiding contamination of the optical member 160.

After the grip has been removed from the attenuator element, the ferrule sleeve 18 can be inserted into position within the sleeve housing 110 as shown in FIG. 15. For insertion of the ferrule sleeve, and the attenuator element disposed therein, into the sleeve housing, one end of the ferrule sleeve is first passed through the top notch 152 and attenuator travel slot 154. Because the cap is made of a resilient polymeric material, the sleeve housing flexes or expands laterally like a clamshell to accommodate the ferrule sleeve. Insertion of the ferrule sleeve is completed by passing the remainder of the ferrule sleeve into the sleeve housing through the top notch 152 and travel slot 154 until the entire sleeve snaps into place within the sleeve housing. At the moment the ferrule sleeve snaps into place, and audible click can be heard by the technician to tell him or her that the sleeve is correctly positioned. This click sound is created by the sleeve housing snapping back into its original, unflexed orientation.

Notably, the insertion of the ferrule sleeve is facilitated by the notches and slots provided in the sleeve housing. In particular, the presence of the top notch 152 and the elongated travel slot 154 in combination with a relatively short bottom notch 158 has been found to provide the resilience needed to permit insertion of the ferrule sleeve, and the strength needed to avoid breakage of the sleeve housing during this insertion. Moreover, the configuration of the partial inner flanges 146 minimizes the shearing of polymeric material from the sleeve housing during installation of the ferrule sleeve. Specifically, the space between the partial inner flanges at the top portion of the sleeve housing allows the ferrule sleeve to pass into the sleeve housing without removing fragments of the sleeve housing.

As shown in FIG. 15, the ferrule sleeve 18 fits within the sleeve housing 110 with a first end adjacent the continuous inner flange 140 and a second end adjacent the partial inner flanges 146 such that longitudinal shifting of the ferrule sleeve within the sleeve housing is minimized. The outer diameter of the ferrule sleeve is such that the first end of the ferrule sleeve is compressed slightly by the distal taper 137 of the main section of the cylindrical passage 126, and the second end of the ferrule sleeve is compressed slightly by the front section 138 of the cylindrical passage 126. This arrangement holds the ferrule sleeve snugly in place within the sleeve housing but permits minor flexing of the medial portion of the ferrule sleeve to reduce axial misalignment of the connector ferrules and to avoid breakage of the optical fiber and ferrules when they are shifted.

When the attenuator is seated within the sleeve housing, its head portion 164 is positioned within the attenuator element travel slot 154. The head portion is sized and shaped to permit the attenuator element to travel longitudinally along the travel slot 154 in response to contact from an optical connector ferrule. As described below, this feature permits proper alignment of the optical member 160 between the optical fiber connector ferrules being coupled and further prevents breakage of the attenuator element.

Figure 16:
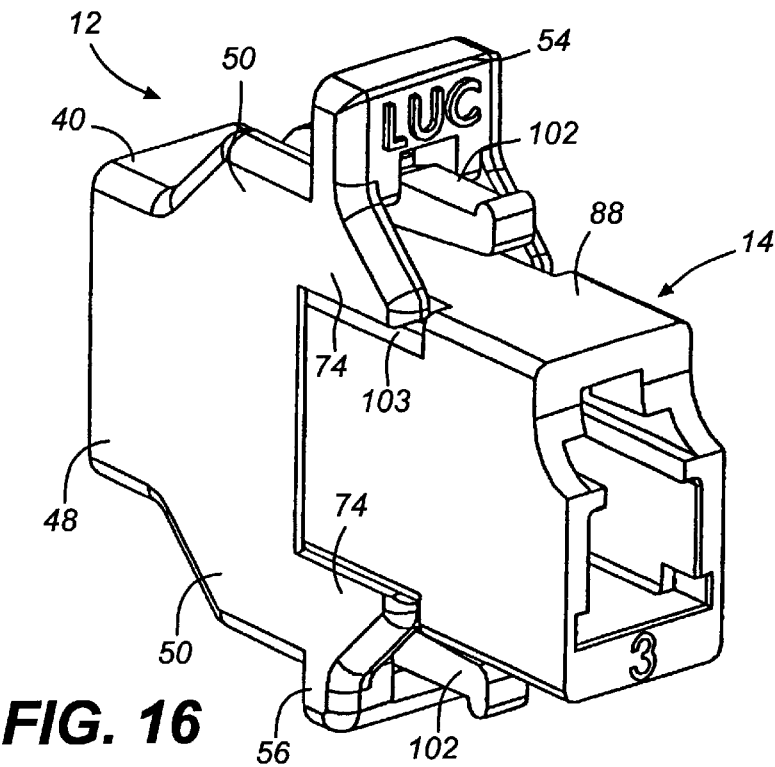
FIG. 16 is a perspective view of the buildout system shown in FIG. 1 illustrating connection of the buildout cap to the buildout base.
Figure 17:
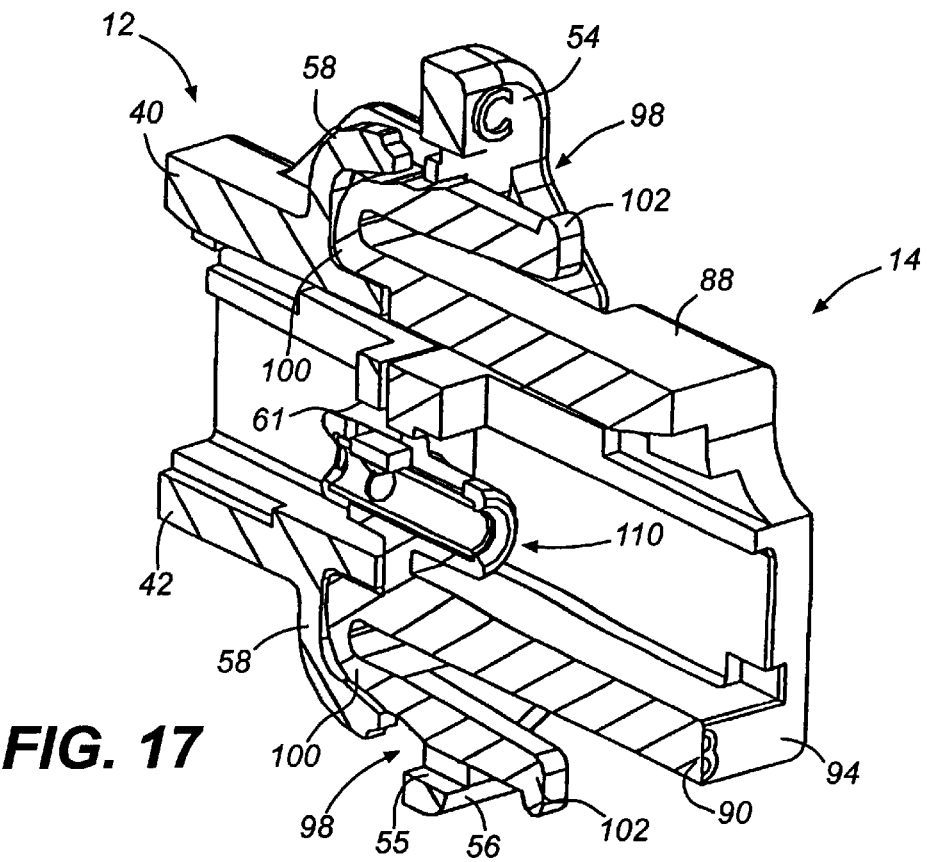
FIG. 17 is a cross-sectional side view of the buildout base and cap shown in FIG. 16.

Once the attenuator element 16 and ferrule sleeve 18 have been positioned within the sleeve housing, the buildout cap 14 can be releasably connected directly to the buildout base 12 as depicted in FIGS. 16 and 17. Because the base and cap are asymmetrical about their medial horizontal planes, the cap will only fit into the base in the orientation shown in FIGS. 16 and 17. The increased height of the base upper panel flange 54 and the arcuate notch 104 of the cap serve as visual indicators to aid the technician in making the connection. In particular, the upper panel flange and the arcuate notch indicate the respective top ends of the base and cap. Even if these indicators are not heeded, however, incorrect connection is prevented due to the keyed configuration of the base.

When the cap is connected to the base, the base portions 100 of the latch tabs 98 of the cap are positioned closely between the side flanges 50 of the base and inwardly of the latch tabs 58 of the base. The upper portions 102 of the latch tabs matingly engage the central notches 55 provided in the panel flanges 54 and 56 of the base and are positioned closely between the side surfaces 53 of the notches. During insertion of the cap into the base, the cap latch tabs first flex and then snap into place. When correctly snapped into place, the close fitting arrangement described above increases the buildout's resistance to side loads by providing a large contact surface area in the longitudinal (transmission) direction between the base and cap. Specifically, when a side load is applied to the cap, the force of the load is distributed along this enlarged contact surface area, reducing the possibility of buildout failure or exaggerated flexure.

In addition to the strength provided by the combination of the cap latch tabs and base side and panel flanges, further strength is provided to the buildout through the combination of the base gussets 74 and the cap recesses 103. As shown most clearly in FIG. 16, the gussets 74 fit within the recesses 103 of the cap to further increase the longitudinal contact surface area between the base and cap.

As illustrated in FIG. 17, the sleeve housing 110 of the cap passes through the lower opening 61 formed in the front side 44 of the base. Because both the cap sleeve housing 110 and the opening 61 are offset toward the bottom of the cap and base respectively, incorrect coupling of the cap and base is prevented. Accordingly, the base and cap are connected in a keyed fashion.

Figure 18:
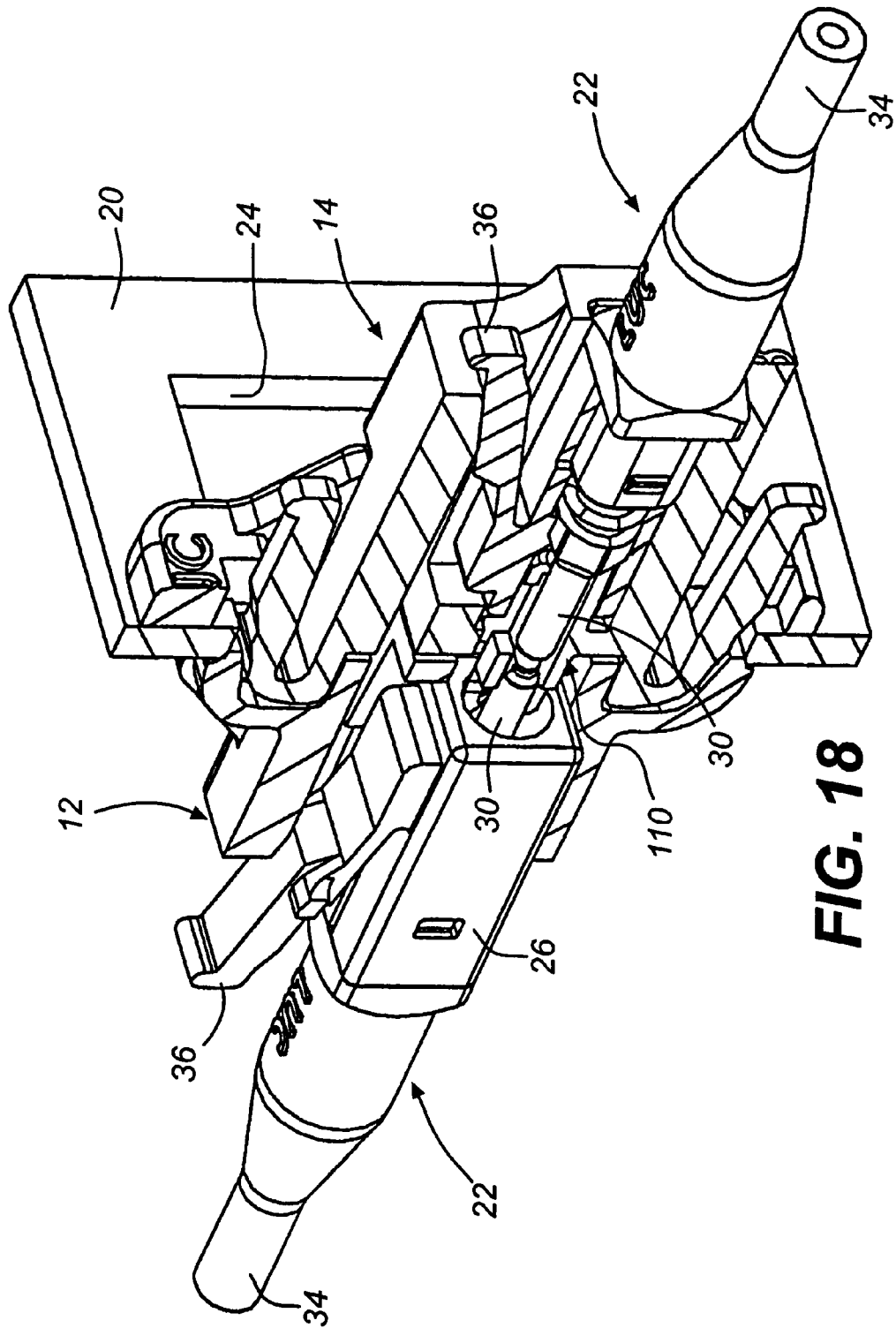
FIG. 18 is a cross-sectional side view of the buildout system shown in FIG. 1 illustrating connection of the buildout base to the panel and the coupling of two optical fiber connectors within the buildout.

FIG. 18 depicts usage of the base and cap (with the sleeve 18 removed for clarity) to couple first and second optical fiber connectors 22 in a panel 20. As indicated in this figure, the base 12 releasably connects to the panel with the upper and lower panel flanges 54 and 56 and the latch tabs 58 contacting the panel. Housed inside the base is a first connector 22. This connector is provided with its own latch tab 36 that releasably engages the inside of the base. Similarly, a second connector 22 is releasably disposed within the cap. As shown in FIG. 18, the ferrule 30 of the connector is housed within the sleeve housing 110 of the cap 14. When the cap is correctly positioned within the base, the ferrules 30 of both connectors are housed within the sleeve housing 110 of the cap. Accordingly, the sleeve normally disposed in the sleeve housing 110 aligns the two ferrules, and therefore the optical fibers, with each other. Due to the resilience of the ferrule sleeve housed within the sleeve housing, the ferrules can shift slightly from side to side without the ferrules or the optical fibers being damaged.

As further indicated by FIG. 18, the attenuator element 16 is positioned between the tips of the two ferrules 30. To prevent breakage of the attenuator during insertion of the cap 14 into the base 12, the attenuator element can be displaced in the longitudinal direction of the sleeve along the attenuator element travel slot 154 of the cap. Due to the relative shortness of the neck portion of the attenuator element, the center of the optical member is radially offset above the central axis of the ferrules. This positioning further reduces the risk of attenuator element breakage by reducing the moment applied to the attenuator element during cap insertion.

Figure 19:
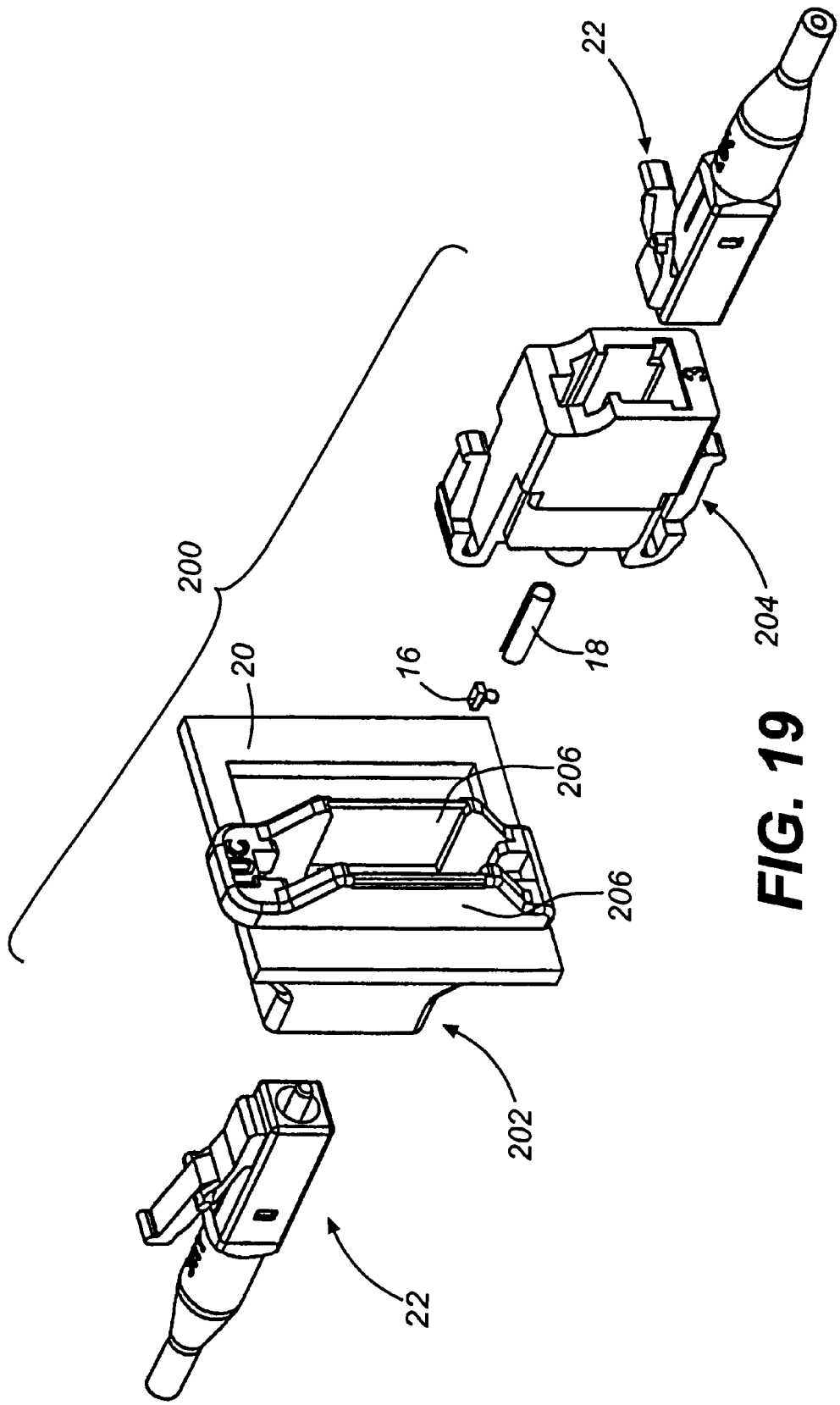
FIG. 19 is an exploded perspective view of a second embodiment of a buildout system constructed in accordance with the present invention shown along with a connection panel and a pair of optical fiber connectors.
Figure 20:
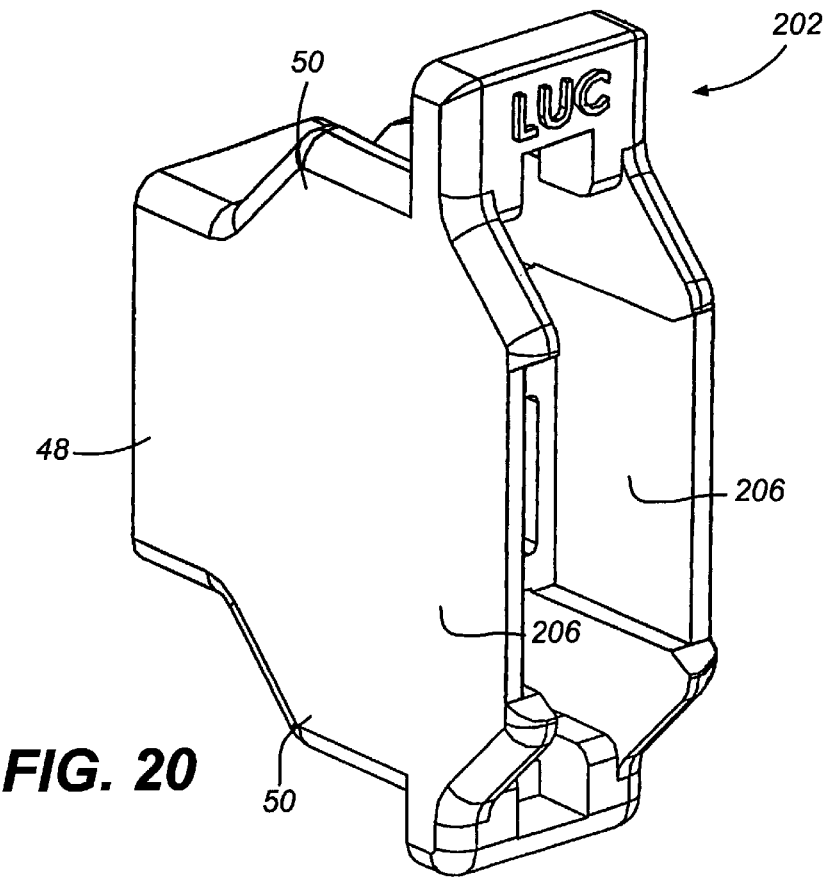
FIG. 20 is a front perspective view of the buildout base of the buildout system shown in FIG. 19.
Figure 21:
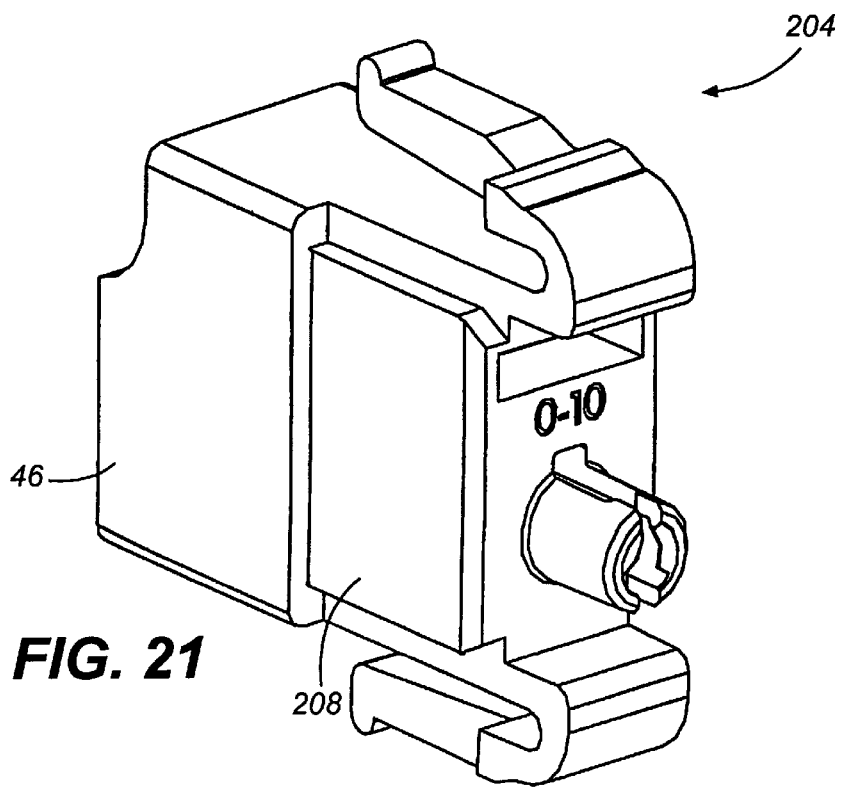
FIG. 21 is a front perspective view of the buildout cap of the buildout system shown in FIG. 19.

FIGS. 19–21 illustrate a second embodiment of a buildout system 200 constructed in accordance with the present invention. As shown in these figures, the buildout system 200 of the second embodiment is similar in construction to that of the first embodiment. Therefore, the disclosure regarding this second embodiment, which follows, is primarily reserved for features specific to the second embodiment alone.

The buildout system 200 of the second embodiment generally comprises a buildout base 202, a buildout cap 204, an attenuator element 16, and a ferrule sleeve 18. Like the buildout system 10 of the first embodiment, the buildout system 200 of the second embodiment is typically used in conjunction with a connection panel 20 and two optical fiber connectors 22. Although the attenuator element 16 and the ferrule sleeve 18 are substantially identical to those used in the first embodiment, the base 202 and cap 204 differ from those of the first embodiment. As indicated in FIG. 20, the vertical flanges 206 of the buildout base 202 extend forwardly a greater distance than those found in the first embodiment. Specifically, these vertical flanges 206 extend from the front side 44 of the base to the tips of the gussets 74 and between the upper and lower gussets such that the vertical flanges 206 are substantially rectilinear and plate-shaped.

To accommodate the relatively large vertical flanges 206 of the base, the cap 204 is provided with vertical recesses 208 that are also larger than those found in the first embodiment (FIG. 21). When the cap 204 is releasably connected to the base 202, the vertical flanges 206 of the base are received by the vertical recesses 208 such that the lateral sides of the cap are positioned closely between the vertical flanges of the base. Because the vertical recesses receive the vertical flanges 206, the vertical recesses 208 are substantially rectilinear and similar in size and shape to the vertical flanges.

The spatial relationship between the vertical flanges 206 and the vertical recesses 208 further increases the size of the contact surface area between the base and cap to further reduce the possibility of buildout failure or exaggerated flexure. It is believed that with the combination of the latch tab arrangement, the gusset/recess arrangement, and the vertical flange/recess arrangement, the buildout can prevent damage to the optical components contained therein even when subjected to side loads of up to 5 pounds applied to the fiber cable of an optical fiber connector in a direction perpendicular to the longitudinal axis of a connector disposed in the cap.

While preferred embodiments of the invention have been disclosed in detail in the foregoing description and drawings, it will be understood by those skilled in the art that variations and modifications thereof can be made without departing from the spirit and scope of the invention as set forth in the following claims.

What is claimed is:

1. Optical fiber buildout apparatus that is resistant to side loads, comprising:

a buildout base including a top side, a bottom side, a front side, a rear side, opposed lateral sides, and a plurality of gussets that extend forwardly from said lateral sides; and a buildout cap including a top side, a bottom side, a front side, a rear side, opposed lateral sides, and a plurality of gusset recesses formed at the junction of said top and bottom sides with said lateral sides, said recesses being sized and shaped to receive said gussets when said cap is releasably connected to said base;

wherein when said cap is releasably connected to said base, said gusset recesses of said cap receive said gussets of said base to increase the surface contact area between said cap and base when said cap is subjected to side loads.

2. The optical fiber buildout apparatus of claim 1, wherein said lateral sides of said base extend beyond said top and bottom sides of said base to form side flanges and wherein said cap further includes upper and lower latch tabs that extend outwardly from said top and bottom sides of said cap, respectively, said latch tabs being adapted to fit closely between said side flanges of said base.

3. The optical fiber buildout apparatus of claim 2, wherein said base further includes upper and lower panel flanges that extend upwardly and downwardly from said opposed lateral sides of said base, respectively, each of said panel flanges having a central notch defined by side surfaces formed therein.

4. The optical fiber buildout apparatus of claim 3, wherein said latch tabs of said cap has a relatively wide base portion and a relatively narrow upper portion, wherein said base portions are sized and shape to fit closely between said side flanges of said base and said upper portions are sized and shaped to fit closely between said side surfaces of said central notches of said base.

5. The optical fiber buildout apparatus of claim 2, wherein said base further includes upper and lower latch tabs that extend upwardly from said top side and downwardly from said bottom side of said base, respectively, said latch tabs of said base being oriented to fit closely about said latch tabs of said cap.

6. The optical fiber buildout apparatus of claim 1, wherein said buildout base further includes vertical flanges and said buildout cap further includes vertical recesses adapted to receive said vertical flanges of said buildout base.

7. Optical fiber buildout apparatus that is resistant to side loads, comprising:
   a buildout base including a top side, a bottom side, a front side, a rear side, opposed lateral sides, and a plurality of gussets that extend forwardly from said lateral sides, said base further including a pair of vertical flanges that extend forwardly from said front side; and
   a buildout cap including a top side, a bottom side, a front side, a rear side, and opposed lateral sides, said cap further including a plurality of gusset recesses and a pair of vertical recesses formed in said lateral sides of said cap;
   wherein when said cap is releasably connected to said base, said gusset recesses of said cap receive said gussets of said base and said vertical recesses of said cap receive said vertical flanges of said base to increase the surface contact area between said cap and base when said cap is subjected to side loads.

8. The optical fiber buildout apparatus of claim 7, wherein said base includes two pairs of upper and lower gussets and said vertical flanges extend from said front side of said base to the tips of said gussets and between each pair of upper and lower gussets such that said vertical flanges are substantially rectilinear and plate-shaped.

9. The optical fiber buildout apparatus of claim 7, wherein said lateral sides of said base extend beyond said top and bottom sides of said base to form side flanges and wherein said cap further includes upper and lower latch tabs that extend outwardly from said top and bottom sides of said cap, respectively, said latch tabs being adapted to fit closely between said side flanges of said base.

10. The optical fiber buildout apparatus of claim 9, wherein said base further includes upper and lower panel flanges that extend upwardly and downwardly from said opposed lateral sides of said base, respectively, each of said panel flanges having a central notch defined by side surfaces formed therein.

11. The optical fiber buildout apparatus of claim 10, wherein said latch tabs of said cap has a relatively wide base portion and a relatively narrow upper portion, wherein said base portions are sized and shape to fit closely between said side flanges of said base and said upper portions are sized and shaped to fit closely between said side surfaces of said central notches of said base.

12. The optical fiber buildout apparatus of claim 9, wherein said base further includes upper and lower latch tabs that extend upwardly from said top side and downwardly from said bottom side of said base, respectively, said latch tabs of said base being oriented to fit closely about said latch tabs of said cap.

13. A method for increasing the resistance to side loads of an optical fiber buildout system that includes a buildout base and a buildout cap, said method comprising the steps of:
   forming opposed lateral sides on the base that extend beyond the top and bottom sides of the base to form side flanges;
   forming, a plurality of gussets on the base that extend forwardly from the lateral sides of the base;
   forming upper and lower latch tabs on the cap that extend outwardly from the top and bottom sides of the cap and that are sized, shaped, and configured to fit closely between the side flanges of the base; and
   forming a plurality of recesses in the cap that are sized, shaped, and configured to receive the gussets of the base;
   wherein when the cap is releasably connected to the base, the latch tabs are positioned closely between the side flanges of the base and the gussets are received by the recesses of the cap such that an enlarged contact surface area is formed between the cap and base when side loads are applied to the cap.

14. The method of claim 13, further comprising the steps of:
   forming upper and lower panel flanges on the base that extend upwardly and downwardly from the opposed lateral sides of the base, respectively, each of the panel flanges having a central notch defined by side surfaces formed therein; and
   forming the latch tabs of the cap to include a relatively wide base portion and a relatively narrow upper portion, wherein the base portions are sized and shape to fit closely between the side flanges of the base and the upper portions are sized and shaped to fit closely between the side surfaces of the central notches of the base.

* * * * *